United States Patent [19]

Wise

[11] 4,339,778
[45] Jul. 13, 1982

[54] DUAL FLOPPY DISC MACHINE
[75] Inventor: Eugene H. Wise, Grass Valley, Calif.
[73] Assignee: Atari, Inc., Sunnyvale, Calif.
[21] Appl. No.: 139,534
[22] Filed: Apr. 11, 1980
[51] Int. Cl.³ .................. G11B 5/016; G11B 17/06
[52] U.S. Cl. ......................................... 360/99; 360/98
[58] Field of Search .................................. 360/97–99, 360/86, 135, 137, 104–105

[56] References Cited
U.S. PATENT DOCUMENTS

| | | | |
|---|---|---|---|
| 3,815,150 | 6/1974 | Stoddard et al. | 360/99 |
| 3,965,485 | 6/1976 | Morin | 360/86 X |
| 4,052,746 | 10/1977 | Weller | 360/99 X |
| 4,224,648 | 9/1980 | Roling | 360/135 |

*Primary Examiner*—John H. Wolff
*Attorney, Agent, or Firm*—Townsend and Townsend

[57] ABSTRACT

A single device for driving a pair of floppy discs, preferably the smaller mini floppy discs, is disclosed herein and identified as a dual floppy disc machine. A drive motor is coupled to a pair of rotatable spindles mounted side by side. The spindles receive respective floppy discs thereon, and are driven at a speed not to exceed 50 rpm, much lower than the speed of conventional floppy disc machines. A pair of read/write heads are provided which have a capacity of reading no more than 20,000 bits per second, again well below conventional rates but sufficient for the speeds used in the present invention. A single carriage has both read/write heads mounted thereon in spaced relationship, and is moveable along an axis bisecting a line connecting the centers of the spindles. As a result, the read/write heads are moveable in unison radially relative to the respective spindles. A stepping motor is coupled to the carriage to move the carriage along its axis. The pair of floppy discs are clamped to their respective spindles, and the read/write heads are biased against the respective discs so that both discs can be utilized.

12 Claims, 5 Drawing Figures

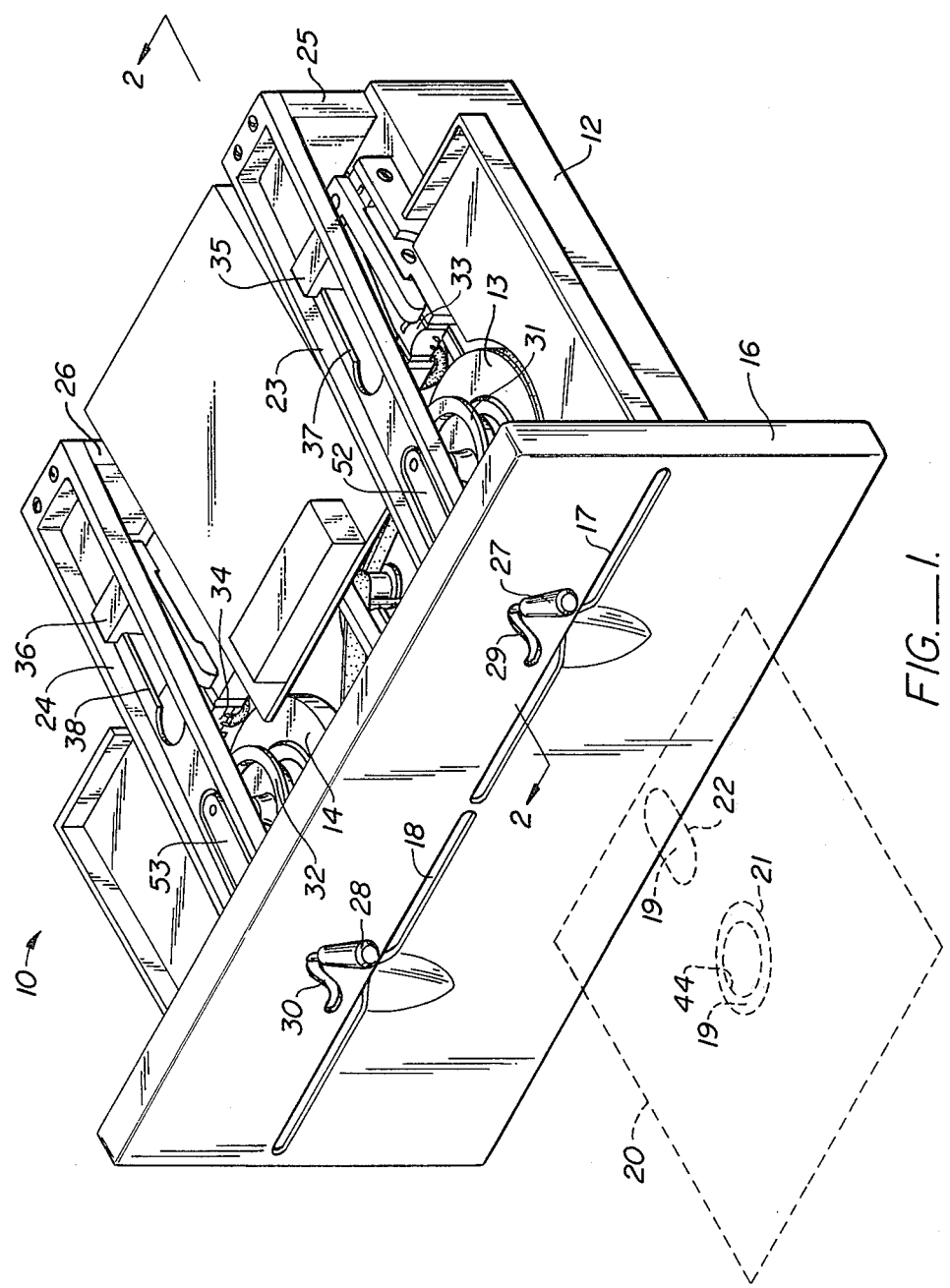
FIG._1.

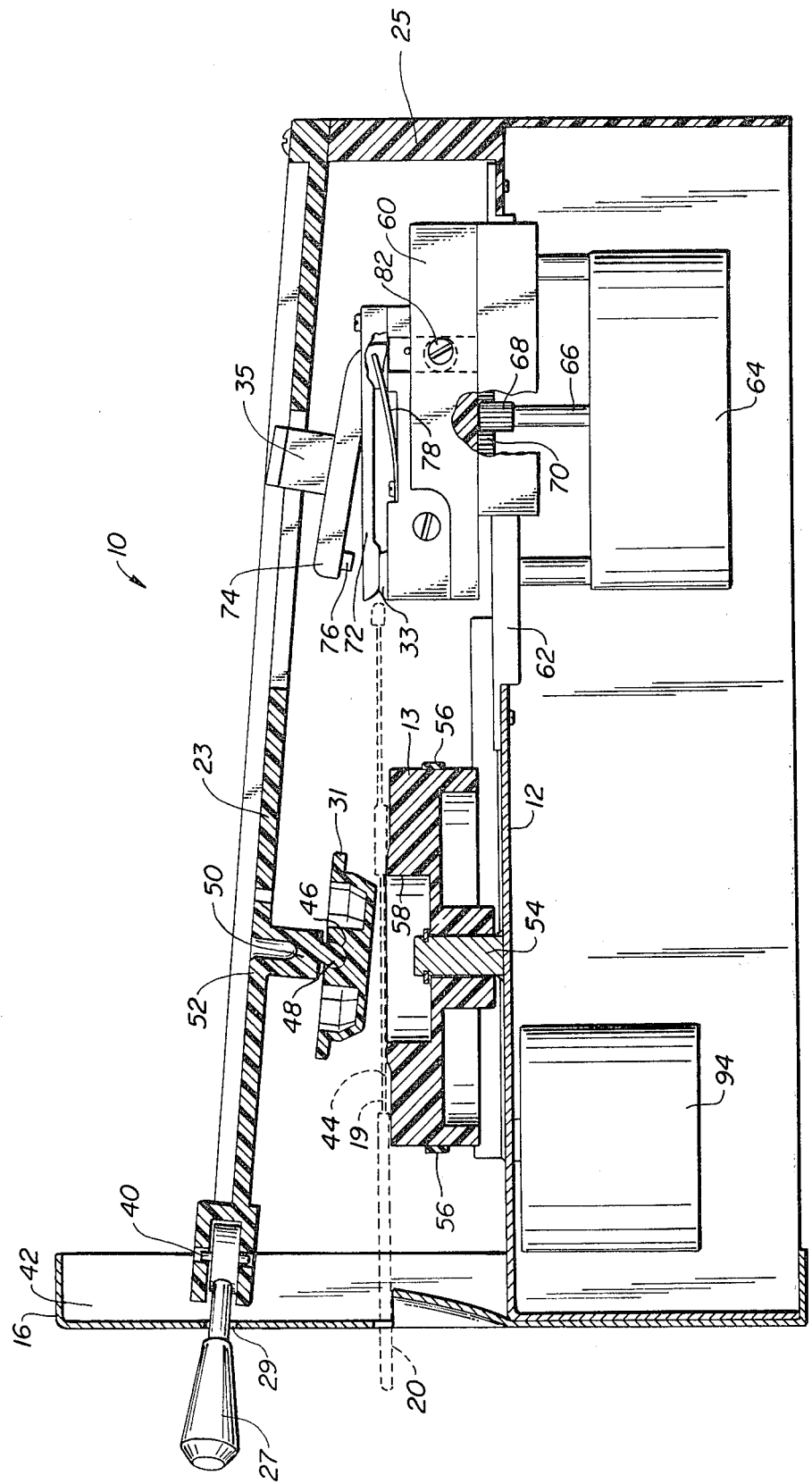
FIG._2.

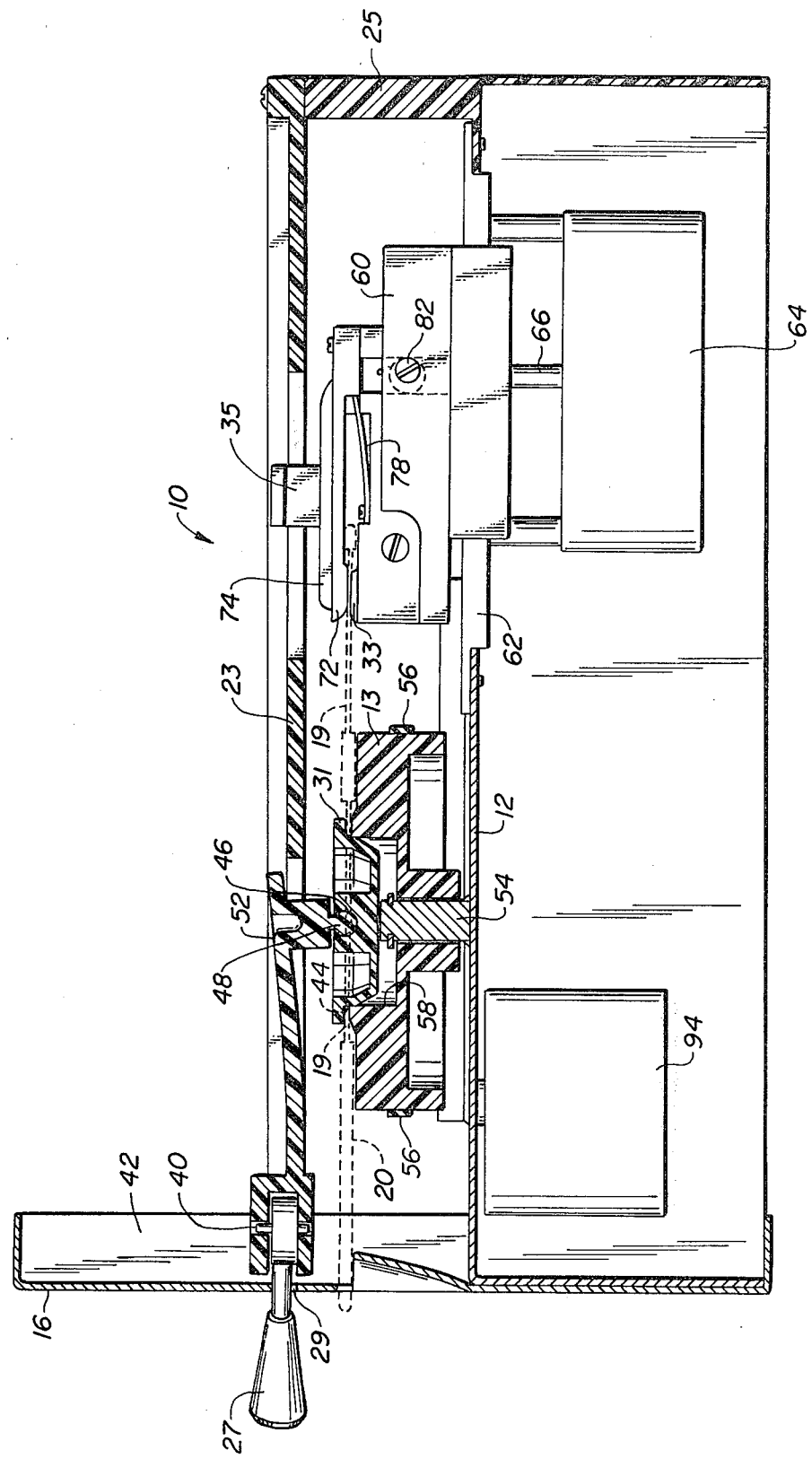

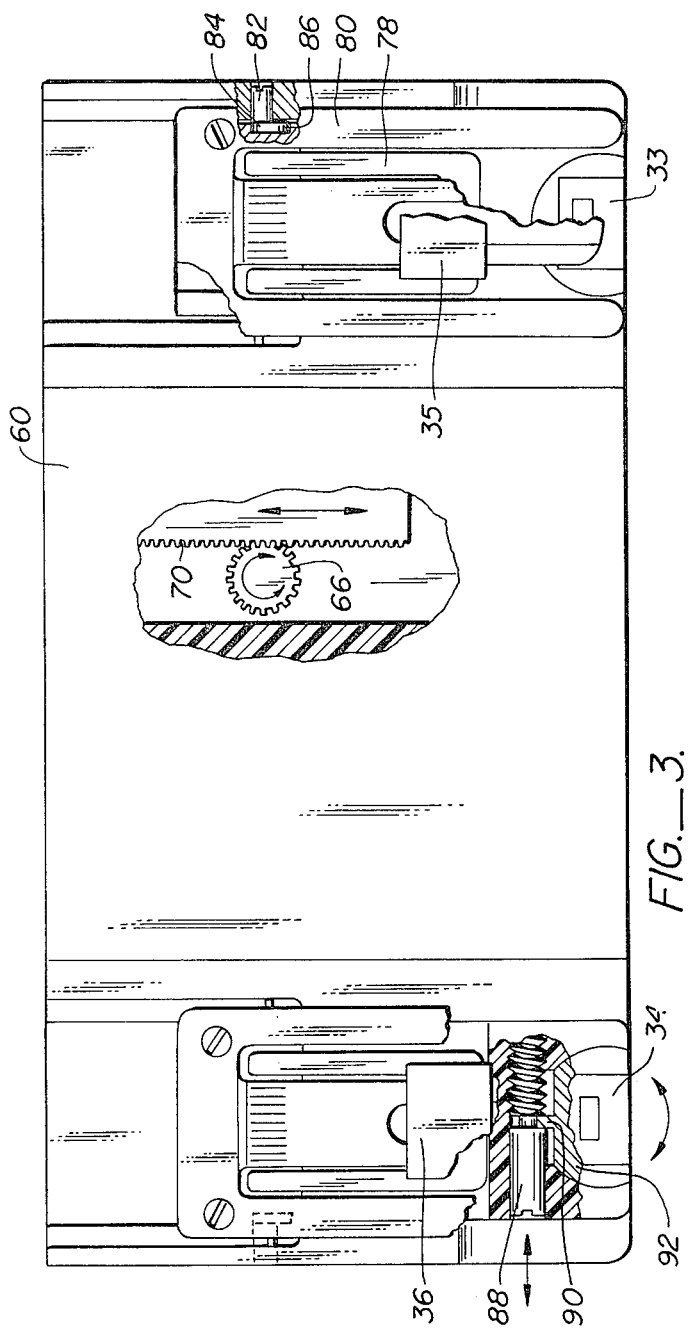
FIG._3.
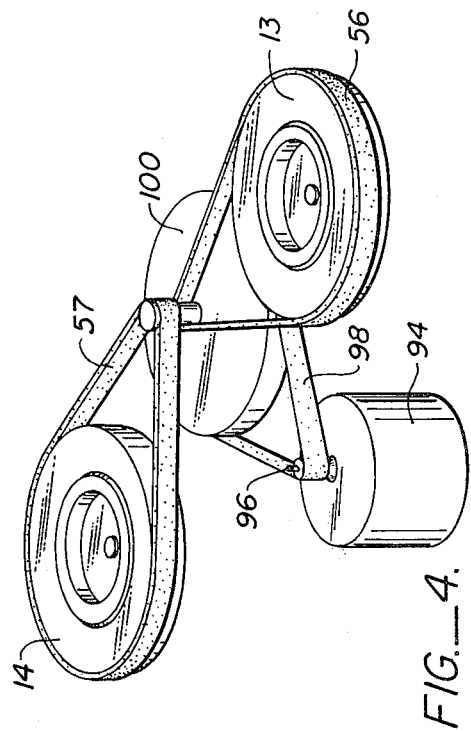
FIG._4.

DUAL FLOPPY DISC MACHINE

BACKGROUND OF THE INVENTION

The present invention relates to floppy disc machines, and in particular to a dual floppy disc machine for use in conjunction with relatively small, inexpensive computers such as a home computer.

Floppy discs are commonly used in computer systems because such discs are capable of storing large volumes of data which can readily be retrieved. A device called a "mini floppy disc" which is smaller than traditional floppy discs is also often used as a storage device in moderately priced computers.

Attempts have been made to incorporate mini floppy disc machines into relatively low priced computers, such as home computers, with limited success. Such disc machines operate at relatively high speeds, and are designed to rigid tolerances for proper indexing of the discs. (Usually two discrete disc machines are used in any computer application.) The cost of such machines is often close to the cost of the main computer used in a home environment. As a result, disc machines have not received widespread acceptance at the low cost end of the computer market.

SUMMARY OF THE INVENTION

The present invention provides a single system for driving a pair of floppy discs, preferably the smaller mini floppy discs. A single drive motor is coupled to a pair of rotatable spindles mounted side by side. The spindles receive respective floppy discs thereon. A pair of read/write heads are provided which have a capacity of reading well below conventional rates but sufficient for the drive speeds used in the present invention. A single carriage has both read/write heads mounted thereon in spaced relationship, and is moveable along an axis bisecting a line connecting the centers of the spindles. As a result, the read/write heads are moveable in unison radially relative to the respective spindles. A stepping motor is coupled to the carriage to move the carriage along its axis. The pair of floppy discs are clamped to their respective spindles, and the read/write heads are biased against the respective discs so that both discs can be utilized.

In the preferred embodiment of the present invention, a pair of arms extend from remote locations over the respective spindles. Clamping members are attached to each arm using a ball and socket connection. The clamping members have a partially conical outer configuration so that they center the discs when engaged therewith. The arms also control the biasing of the disc media against the read/write heads so that movement of a single armature allows insertion and removal of a floppy disc.

The present invention provides a rotational speed for the floppy discs of typically no greater than 50 rpm. As a result, a much less sophisticated read/write head is required, and the capacity of the head need be no more than 20,000 bits per second. Moreover, the present invention provides a relatively simple and straightforward design in which one unit with a single drive motor and stepping motor are used to control the operation of the pair of floppy discs.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a preferred embodiment of the floppy disc machine of the present invention.

FIG. 2 is a cross sectional elevation view taken along lines 2—2 of FIG. 1.

FIG. 2A is a view similar to that of FIG. 2 showing the arm in the latched position.

FIG. 3 is a partially cutaway plan view of the carriage of the embodiment of FIG. 1.

FIG. 4 is a schematic view of the drive mechanism of the embodiment of FIG. 1.

DESCRIPTION OF THE PREFERRED EMBODIMENT

The preferred embodiment 10 of the dual floppy disc machine of the present invention is illustrated generally by way of reference to FIG. 1. Machine 10 includes a frame 12 having a pair of spindles 13, 14 rotatably mounted side by side thereon. A face plate 16 attached to frame 12 includes a pair of lateral slits 17, 18 through which respective floppy discs can be inserted. A typical floppy disc is illustrated in phantom at 20, and includes a central circular cutout 21 for driving the media 19 inside the cover, and an oblong cutout 22 allowing access to the media for the purpose of storing and retrieving data.

A pair of arms 23, 24 are attached to posts 25, 26 at the rear of frame 12. Arms 23, 24 are made of slightly resilient material, preferably polypropylene, so that the forwardly projecting free ends can be moved up and down to some degree. Swivel knobs 27, 28 project through S-shaped slots 29, 30 in face plate 16 and serve to control the vertical movement of the forward ends of arms 23, 24.

Clamping members 31, 32 depend from cutout portions 52, 53 of the respective arms 23, 24 at the forward end of each. When knobs 27, 28 are moved downwardly, clamps 31, 32 engage the floppy discs inserted through slots 17, 18 and attach them firmly to spindles 13, 14.

Read/write heads 33, 34 are provided for reading from and writing on the floppy discs. The discs are read from the bottom, and a biasing member (not visible in FIG. 1) maintains the floppy discs in contact with heads 33, 34 when arms 23, 24 are lowered. Each biasing arm is connected to a t-shaped bracket 35, 36 respectively which fits in grooves 37, 38 in arms 23, 24. As a result, when the arms are raised, the biasing members are lifted out of contact with the floppy discs.

The manner in which the floppy discs are secured within disc machine 10 is illustrated in more detail by way of reference to FIGS. 2 and 2A, together with FIG. 1. FIG. 2 shows latching arm 23 in its unlatched position, and FIG. 2A showing the arm in its latched position. Only one side of the latching system of disc machine 10 is illustrated in detail, the two sides being mirror images of one another.

Referring initially to FIGS. 1 and 2, swivel knob 27, which pivots about a generally vertical axis at the leading end of latching arm 23, is moved forward to the right. Knob 27 is thus at the upper extremity of S-shaped slot 29, and latching arm 23 is in its maximum upward position. The resiliency of arm 23 generally maintains the arm in its raised position, which is reinforced by the location of knob 27 at the upper end of slot 29.

With arm 23 in its raised position as illustrated in FIG. 2, clamping member 31 is above and spaced from spindle 13. In this configuration, disc 20 can readily be removed and reinserted so that the central aperture 44 in media 19 overlies the center of spindle 13.

Clamping member 31 has an upwardly opening socket 46 engaged by a ball 48 depending on a shaft 50 from arm 23. Shaft 50 is mounted on a cutout portion 52 in latching arm 23, as is apparent from FIG. 2. Because of the resilient nature of latching arm 23, cutout portion 52 serves effectively as a spring, as will be illustrated in more detail hereinafter.

Spindle 13 is rotatable about a fixed central shaft 54. A drive belt 56 connects both spindles 13, 14 to a centered capstan driven by a single drive motor 94, as will be illustrated in more detail hereinafter.

Spindle 13 has a central depression 58 generally corresponding to the outer surface of clamping member 31 and aperture 44 in disc media 19.

A single carriage 60 contains both read/write head 33, depicted in FIG. 2, and read/write head 34 (see FIG. 1). Carriage 60 is mounted on a track 62 so that it can slide forwardly and backwardly relative to the pair of spindles 13, 14 along an axis bisecting a line connecting the center of the spindles. A single stepping motor 64 has an output shaft 66 containing a pinion gear 68. Pinion gear 68 engages a linear gear tooth rack 70 on carriage 60 to move heads 33, 34 radially relative to spindles 13, 14.

A resilient overarm 72 overlies read/write head 33. A biasing member 74 having a felt pad 76 is biasing downwardly by spring 78. A t-shaped bracket 35 is attached to biasing member 74. When arm 23 is raised as illustrated in FIG. 2, bracket 35 lifts biasing number 74 out of engagement with disc 20 (FIG. 2A) permitting disc 20 to be readily inserted or removed over head 33.

The operation of arm 23 in securing floppy disc 20 to the drive is illustrated generally by way of reference to FIG. 2A. Disc 20 is inserted so that its central aperture 44 overlies the circular depression 58 in spindle 13. In this configuration, the edge of disc 20 projects between read/write head 33 and overarm 72 so that the transducer has access to the disc media.

When arm 23 is moved downwardly, the conical portion of clamping member 31 centers the disc. When arm 23 is moved downwardly its full travel, clamping member 31 is biased downwardly by the spring action of cutout 52 and firmly attaches disc 20 to spindle 13.

When arm 23 reaches its maximum downward position, swivel knob 27 is at the bottom of slot 29 in face plate 16. Knob 23 thus becomes wedged in position, maintaining arm 23 in its maximum downward position.

With arm 23 in its down position, spring 78 forces biasing member 74 with felt pad 76 downwardly into contact with disc media 19. As a result, biasing member 74 biases disc media 19 against read/write head 33 so that the transducer can communicate with the disc media.

Carriage 60 is illustrated in detail by way of reference to FIG. 3. Both read/write heads 33, 34 are located on the same carriage. Rotation of pinion gear 68 engaging rack 70 moves heads 33, 34 in unison radially with respect to their associated spindles.

Fine adjustments can be made in the placement of read/write heads 33, 34 on carriage 60. Referring specifically to the apparatus controlling head 33, the head is mounted on a subassembly 80. A screw 82 has a cam portion 84 abutting the cam follower 86 on subassembly 80. Rotation of screw 82 causes longitudinal movement of subassembly 80, and therefor head 33.

Azimuth adjustments of read/write heads 33, 34 can be made by a second adjustment screw such as screw 88 for head 34. Rotation of adjustment screw 88 causes transverse movement of a peg 90 emanating from a rotatable plate 92 supporting head 34. Accordingly slight rotational adjustments may be made as necessary to align head 34 with the disc media.

The manner in which spindles 13, 14 are driven can be illustrated by FIGS. 2 and 4 in combination. Drive motor 94 has an output shaft 96 driving a belt 98, which in turn drives an intermediate capstan 100. A pair of belts 56, 57 emanate from capstan 100, and drive spindles 13, 14 respectively.

Drive motor 94, together with its associated belt drives, rotates spindles 13, 14, at a speed no greater than 50 rpm., much lower than conventional floppy disc machines. A speed of 30-35 rpm is preferred, which is much slower than the 200 rpm or greater traditionally used on mini floppy disc machines. Correspondingly, read/write heads 33, 34 have a speed capability well below conventional rates in a floppy disc machine. Because of the low drive speed, heads 33, 34 need only be able to read and write no more than 20,000 bits per second, far less than normal. However, the combination of low speed drive with low capacity heads results in a device with adequate frequency response for relatively low cost computer applications, such as home computers.

In operation, arms 23, 24 are normally maintained in their raised position until mini floppy discs have been inserted. After insertion of the discs through slits 17, 18, the arms are lowered, the knobs 27, 28 maintain them in their lowered position.

Referring specifically to arm 23, lowering of the arm causes the conical portion of clamping member 31 to engage the central aperture 44 in the disc. The conical shape of clamping member 31 centers the disc media, which is then firmly clamped against spindle 13. In addition, lowering of arm 23 allows arm 74 to bias the disc media against read/write head 33.

Both spindles 13, 14 are driven by a single drive motor 94 at a fixed, relatively low speed. Heads 33, 34 on carriage 60 are indexed in unison by stepping motor 64. Yet, the disc machine of the present invention presents an extremely simple, straightforward device which is financially feasible for use in low cost computers such as those used in the home.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims:

What is claimed is:

1. A dual floppy disc machine comprising:

a single drive motor having an output shaft;

a pair of rotatable spindles mounted side by side and adapted to receive respective floppy discs thereon;

means for coupling the output shaft of the drive motor to the spindles to drive both said spindles simultaneously;

a pair of read/write heads having a frequency response substantially less than conventional disc machines;

a single carriage having said read/write heads mounted in spaced relationship thereon, said carriage being movable along an axis bisecting a line connecting the centers of the spindles so that the read/write heads are movable in unison radially relative to the respective spindles;

a stepping motor coupled to said carriage to move the carriage along said axis; and a pair of latching arms, each arm including means for clamping a floppy disc to its respective spindle and means for biasing the read/write head against its respective disc so that the disc may be clamped in place and the read/write head properly biased by a single movement of the latching arm.

2. A disc machine as recited in claim 1 wherein said coupling means includes an intermediate capstan connected to the output shaft of the drive motor by a belt and driven thereby, and a pair of driven belts coupling the intermediate capstan to the respective spindles to drive the spindles simultaneously.

3. A disc machine as recited in claim 1 wherein the stepping motor includes a pinion gear coupled to its output shaft, and wherein the carriage includes an elongate rack engaged by the pinion gear to couple the stepping motor to the carriage.

4. A disc machine as recited in claim 1 wherein said clamping means includes a clamping member mounted to a resilient cutout portion of said latching arm and having a partially conical outer circumference adapted to engage and center the media portion of the disc and secure it to the spindle, said clamping member attached to the latching arm by a ball and socket connection which allows the clamping member to swivel and align itself with the spindle regardless of the orientation of the cutout portion.

5. A disc machine as recited in claim 4 wherein said clamping members are mounted to resilient cutout portions of the latching arms to provide a biasing force on the clamping members.

6. A disc machine as recited in claim 1 wherein the coupling means drives the spindles at no more than 50 rpm., and the read/write heads have a capacity of no more than 20,000 bits per second.

7. A dual floppy disc machine comprising:

a single drive motor having a output shaft;

a pair of rotating spindles mounted side by side and adapted to receive respective floppy discs thereon;

means for coupling the output shaft of the drive motor to the spindles to drive both said spindles simultaneously at a speed not exceeding 50 rpm;

a pair of read/write heads having a capacity of no more than 20,000 bits per second;

a single carriage having the read/write heads mounted in spaced relationship thereon and including an elongate gear tooth rack, said carriage being movable along an axis parallel to the rack and bisecting a line connecting the centers of the spindles so that the rear/write heads are moveable in unison radially relative to the respective spindles;

a stepping motor having a pinion gear coupled to its output shaft and engaged with the rack on the carriage to move the carriage along said axis;

a pair of latching arms extending over the respective spindles and moveable toward and away from said spindles;

a pair of clamping members swivably attached to the respective arms in juxtaposition to the spindles and having partially conical outer portions so that movement of the arms toward the spindles centers the discs and clamps them to the spindles, said swivable attachment defined by a ball and socket connection and allowing the clamping member to rotate and the plane of the clamping member to align itself with the spindle;

means operatively connected to the latching arms for biasing the disc into contact with the respective read/write heads when the latching arm is moved toward the spindle;

means for disengaging the read/write heads from the discs when the respective latching arms are moved in a direction away from the spindles; and means for releasably securing the latching arms in position after movement thereof toward the spindles for transferring information to and from the discs.

8. A disc machine as recited in claim 7 and additionally comprising a frame, wherein the latching arms are rigidly fastened to the frame at a position remote from the spindles, and wherein the latching arms are made of slightly resilient material to provide a spring force opposing movement of the arms toward the spindles.

9. A device as recited in claim 8 wherein the arms are made of a resilient material.

10. A device as recited in claim 7 wherein the arms each have a slot generally overlying the location of the read/write heads, and wherein the disengaging means comprises a bracket engaging said slot.

11. A device as recited in claim 7 and additionally comprising a pair of screws for adjusting the azimuth of the respective read/write heads.

12. A device as recited in claim 7 and additionally comprising a rotatable cam for adjusting the longitudinal position of the respective read/write heads parallel to said axis.

* * * * *